Sept. 13, 1966  D. H. RHINO  3,271,822
CARBIDE FACING FOR EXTRUSION DIES
Filed Jan. 15, 1965  4 Sheets-Sheet 1
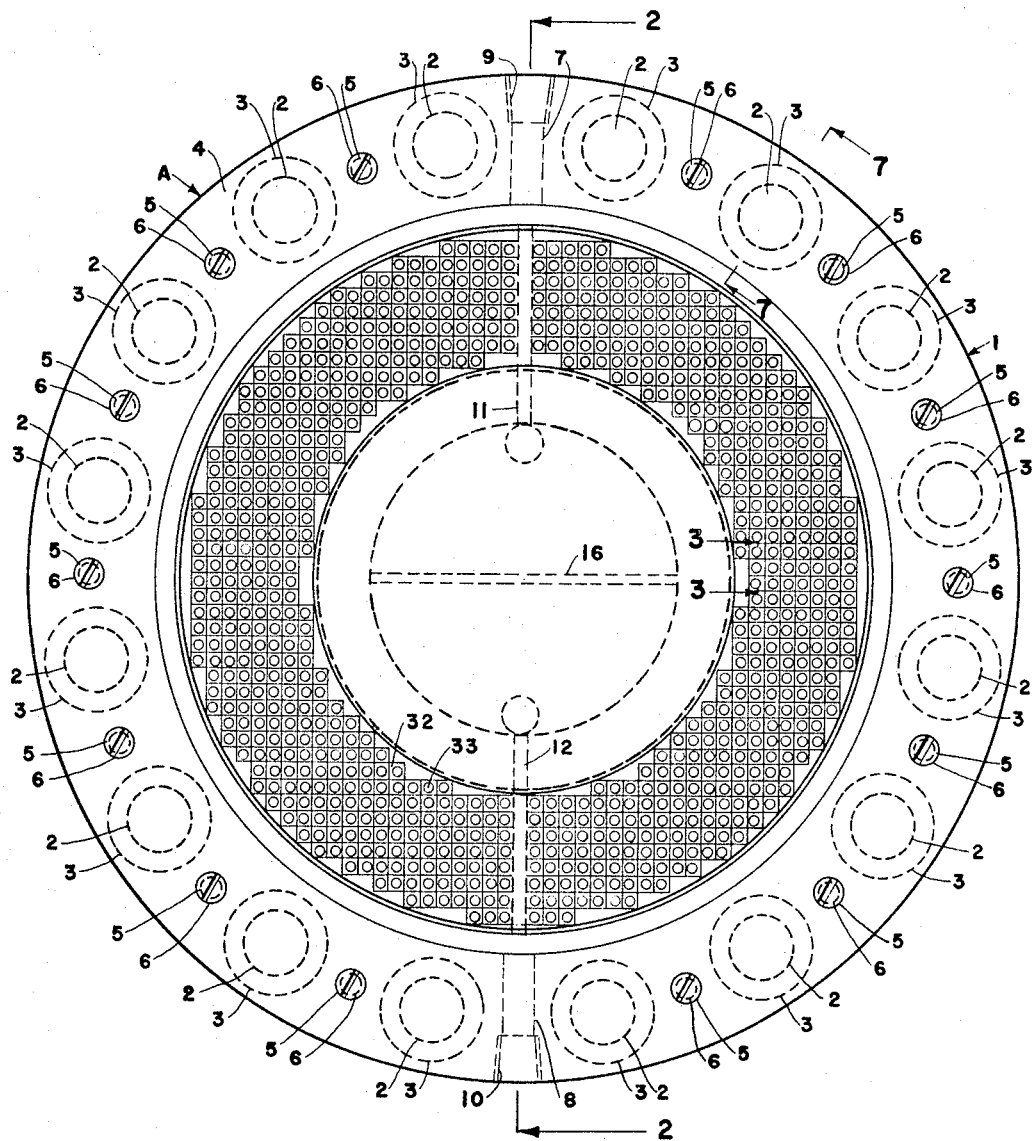
FIG. I
INVENTOR.
DEL H. RHINO
BY *Alfred W. Ketchap*
ATTORNEY

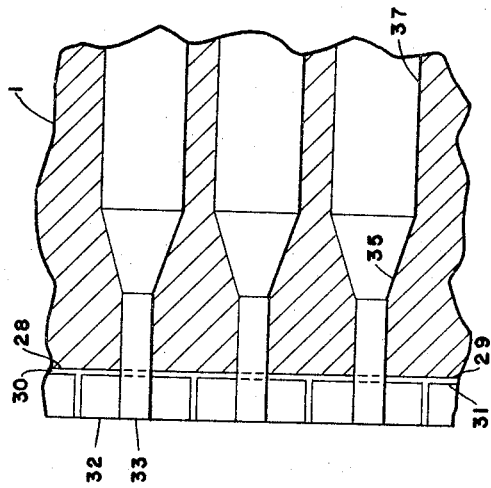
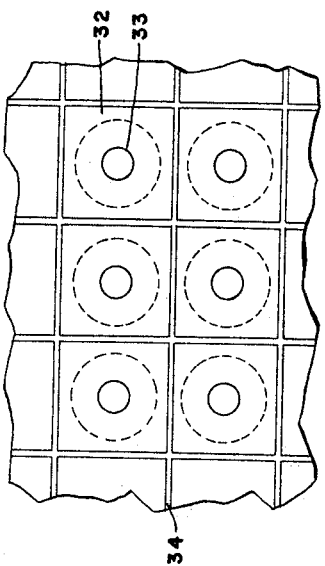
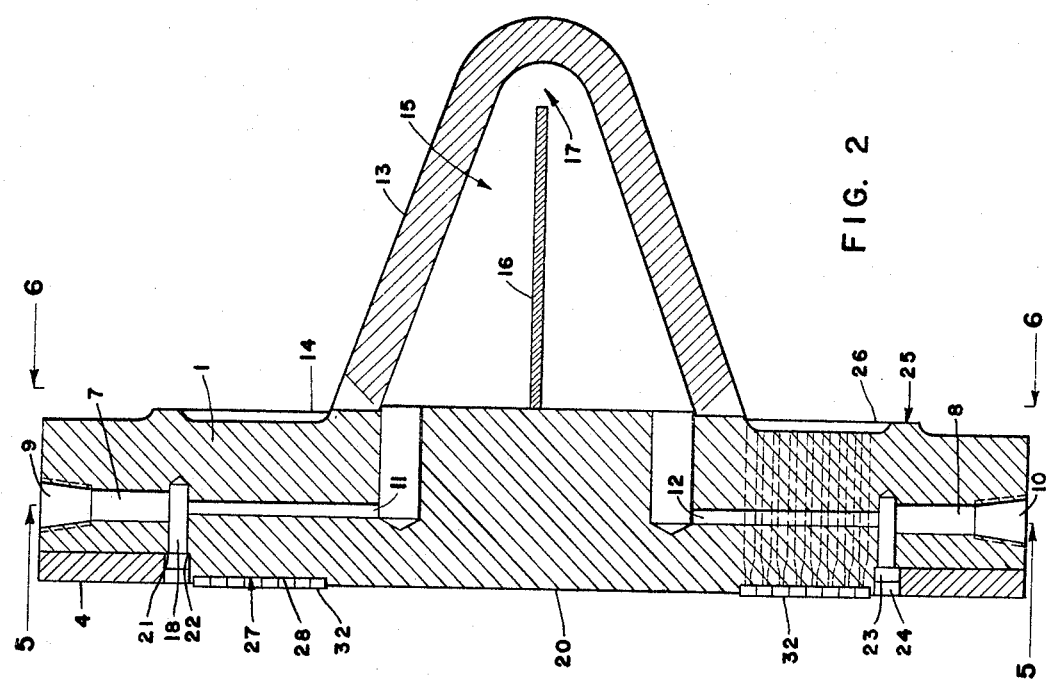

Sept. 13, 1966  D. H. RHINO  3,271,822
CARBIDE FACING FOR EXTRUSION DIES
Filed Jan. 15, 1965  4 Sheets-Sheet 3

INVENTOR.
DEL H. RHINO
BY Alfred W Petchaft
ATTORNEY

Sept. 13, 1966   D. H. RHINO   3,271,822
CARBIDE FACING FOR EXTRUSION DIES
Filed Jan. 15, 1965   4 Sheets-Sheet 4

INVENTOR.
DEL H. RHINO
BY Alfred W. Ketchaft
ATTORNEY

3,271,822
CARBIDE FACING FOR EXTRUSION DIES
Del H. Rhino, Rogers, Ark., assignor to United-Greenfield Corporation, Chicago, Ill., a corporation of Delaware
Filed Jan. 15, 1965, Ser. No. 425,722
6 Claims. (Cl. 18—12)

This invention relates in general to certain new and useful improvements in extrusion dies having a tungsten carbide facing and to methods for making the same.

In extruding synthetic resins and similar materials to form pellets, the extruded material is cut into pellets by a knife which periodically wipes across the external face of the die. This wiping or cutting action will rapidly wear out dies made of conventional tool steel and, therefore, many efforts have been made to provide such dies with a facing of tungsten carbide. However, the interior of the die must be kept hot while at the same time the exterior face of the die must be kept cool. The resulting uneven heating and cooling causes a great degree of expansion and contraction of the die which, in turn, has caused tungsten carbide veneers on die faces to chip and flake off.

It is, therefore, the primary object of the present invention to provide an extrusion die which is faced with tungsten carbide in such a manner that the facing is smooth and permanent.

It is an additional object of the present invention to provide a method for facing an extrusion die with tungsten carbide wafers which are leveled so that the surfaces thereof are precisely in the plane with respect to each other.

It is a further object of the present invention to provide an extrusion die faced with tungsten carbide wafers which will not chip or flake off as a result of thermal expansion or contraction of the extrusion die.

It is also an object of the present invention to provide a method by which wafers of tungsten carbide may be easily, conveniently, and securely bonded to the face of an extrusion die.

With the above and other objects in view, my invention resides in the novel features of form, construction, arrangement, and combination of parts presently described and pointed out in the claims.

In the accompanying drawings—

FIG. 1 is a front elevational view of the face of an extrusion die constructed in accordance with and embodying the present invention;

FIG. 2 is a vertical sectional view taken along line 2—2 of FIG. 1;

FIG. 3 is an enlarged fragmentary horizontal sectional view taken along line 3—3 of FIG. 1;

FIG. 4 is an enlarged fragmentary front elevational view showing in more detail the carbide-wafer facing elements forming a part of the extrusion die;

Figure 5:
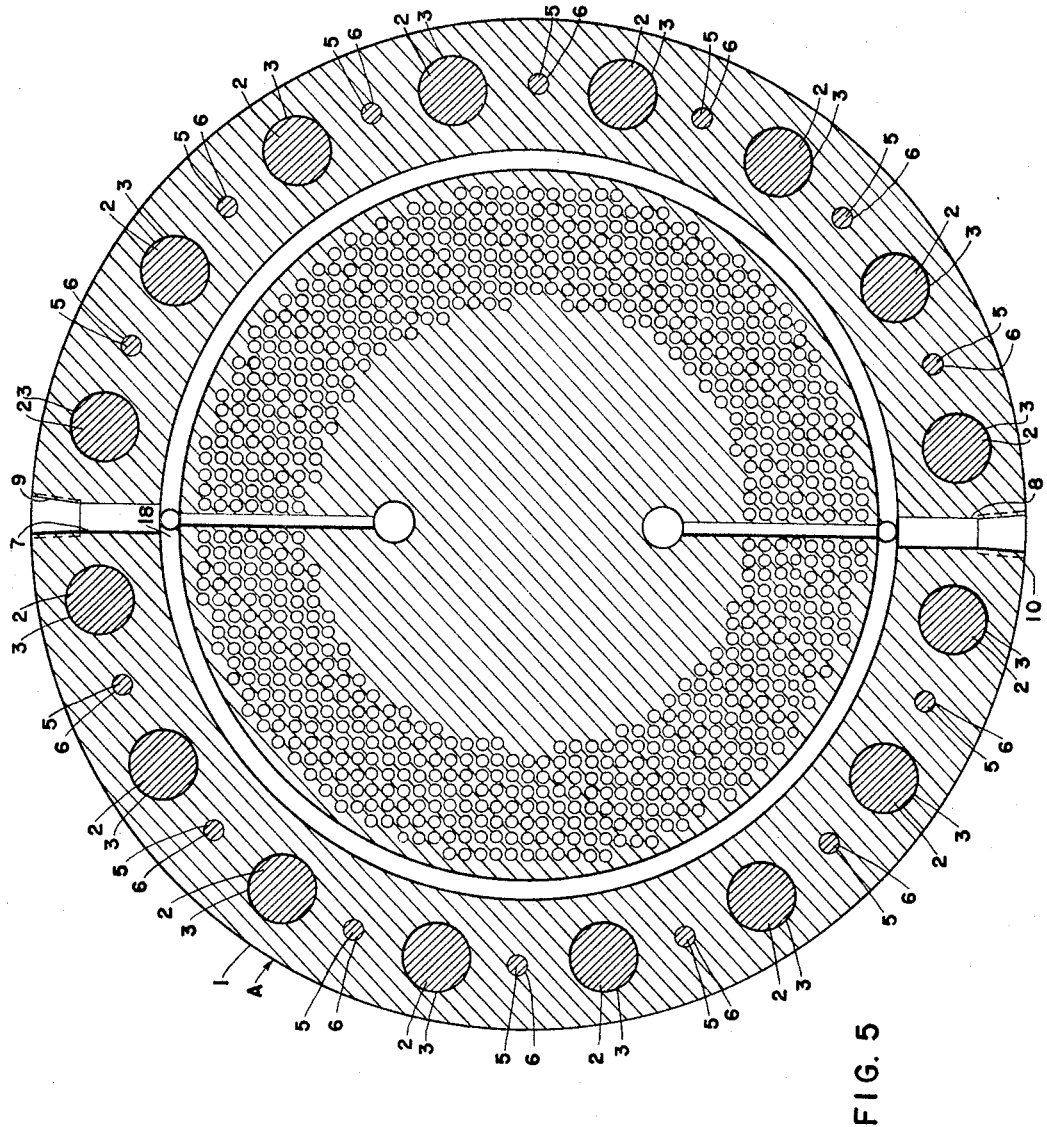
FIG. 5 is a horizontal sectional view taken along line 5—5 of FIG. 2.
Figure 7:
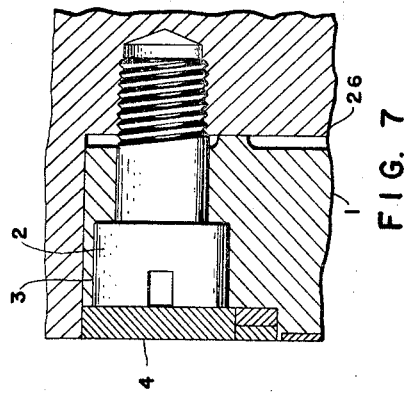
FIG. 7 is a fragmentary vertical sectional view taken along line 7—7 of FIG. 1.
Figure 6:
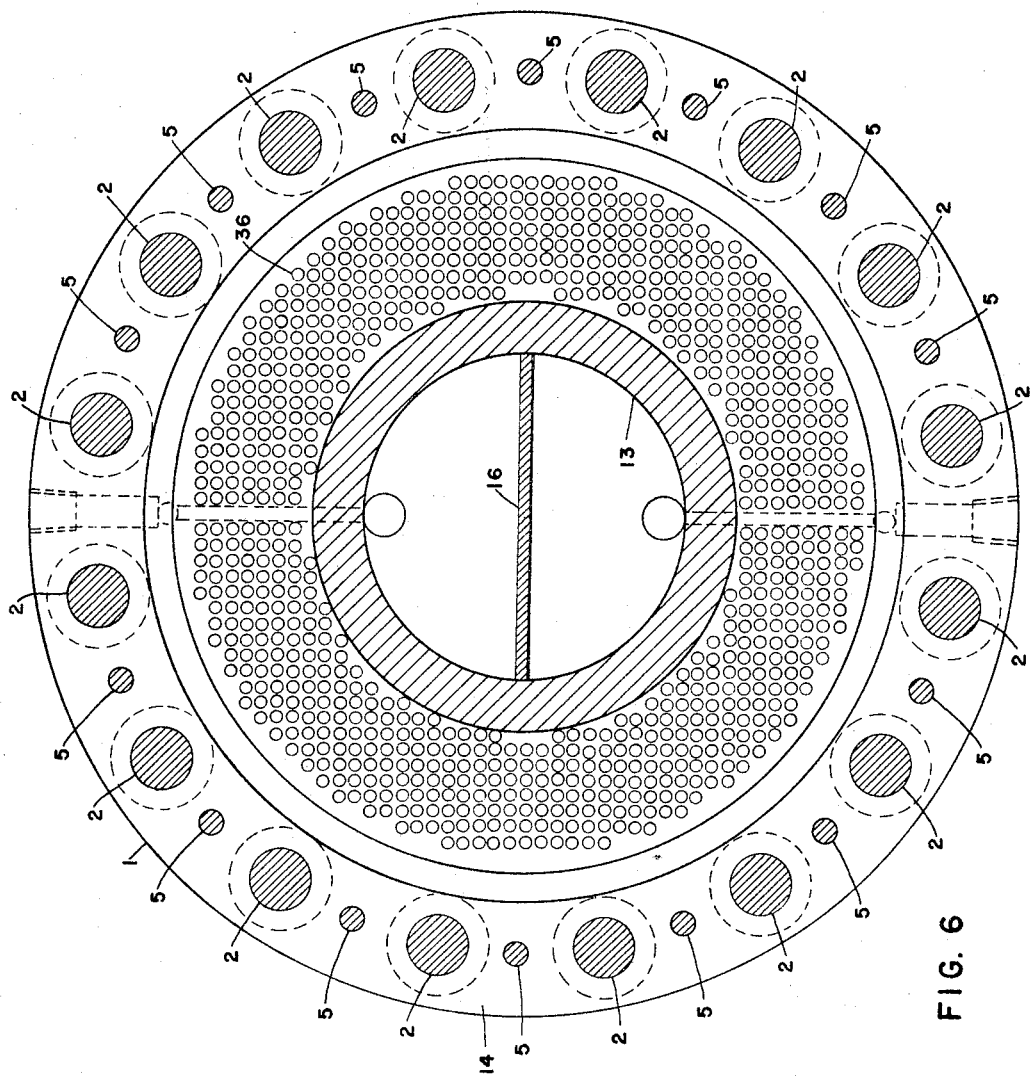
FIG. 6 is a horizontal sectional view taken along line 6—6 of FIG. 2.
Figure 8:
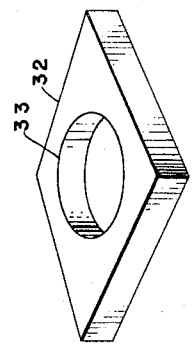
FIG. 8 is an enlarged perspective view of a carbide-wafer facing element forming a part of the present invention.

Referring now in more detail and by reference characters to the drawings, which illustrate a preferred embodiment of the present invention, A designates an extrusion die adapted for use with a conventional extruder. Since the extruder is conventional and does not constitute a part of the present invention, it is not shown or described herein. It is sufficient for present purposes merely to point out that the extrusion die A comprises a cylindrical die-body 1 and is mounted on such extruder by means of a plurality of threaded bolts 2 extending through a plurality of counterbored drill-holes 3 which are equally spaced around the outer periphery of the die-body 1. In order to prevent the extruded material from filling in the counterbored drill-holes 3, at its forward face of the die-body 1 is annularly milled out at its outer periphery in the provision of an annular groove and an annular ring 4 is fitted snugly therein for covering the counterbored drill-holes 3. The ring 4 is, in turn, held in place by small chrome-plated retention screws 5 which pass through apertures 6 in the metal ring 4 and are threaded into the die-body 1. The heads of these screws 5 are flush with the surface of the ring 4 but are of small area and if they become somewhat coated with extruded material, it will be a very thin coating that can be readily scraped off whenever it may be necessary to remove the screws 5 and ring 4.

The die-body 1 is radially bored to provide two diametrally opposite tubular steam ducts 7, 8, the outer ends of which are enlarged and threaded to form recesses 9, 10, for the reception of steam inlet and outlet pipes (not shown). At their inner ends, the ducts 7, 8 open into enlarged axially extending parallel passages 11, 12, which, in turn, open into a rearwardly extending conical steam-dome 13 welded concentrically upon the rear face 14 of the die-body 1 to form a steam chamber 15 which is transversely sub-divided by a triangular metal baffle plate 16, the latter being disposed in a plane perpendicular to the rear face 14 of the die-body 1 and being also welded in place. At its rear end, the baffle plate 16 is spaced inwardly from the apex of the steam-dome 13 to provide a transverse passage 17 so that steam will flow readily from between the passages 11, 12.

A deep annular groove 18 is cut into the forward face 20 of the die-body 1 to a depth sufficient to intersect and communicate with the ducts 7, 8. Furthermore, the groove 18 is undercut at its forward end to provide shoulders 21, 22 for the reception of an annular metal sealing ring 23, which is held in place by an annular welded seam 24 which is then ground off on its outer face so as to be exactly flush with the forward face 20 of the die-body 1. The groove 18 conducts steam around the periphery of the die-body 1 which is in close contact with the material to be extruded, thereby helping to maintain such material in plastic state.

Formed upon the rear face 14 of the die-body 1 about midway between the center and periphery thereof is an annular boss 25 having a rearwardly presented milled face 26 for seating against the machine upon which the die A is to be mounted.

On its forward face 20, the die-body 1 is provided with a concentric depression 27 having a flat bottom face 28. Disposed upon the bottom face 28 is a thin sheet of silver brazing material 29 which is compounded in the conventional manner and which has been cut so that it exactly fits within the depression 27. Disposed immediately above, and in exact alignment with, the sheet of brazing material 29 is a sheet of copper foil 30 which has also been cut so that it exactly fits within the depression 27. A second sheet of brazing material 31 of the same size and composition as the first sheet of brazing material 29 is disposed directly above the annular sheet of copper foil 30.

Manually laid upon the surface of the sheet of brazing material 31 and within the depression 27 is a plurality of square sintered tungsten carbide wafers 32, which are preformed with apertures 33 and are sintered in a conventional manner. A sufficient number of wafers 32 are employed so as to cover the entire area of the depression 27 and are arranged in a checker-board pattern with uniform spacing therebetween, as shown in FIG. 3. These spaces are filled with thin strips 34 cut from a ribbon of a commercially available laminate composed of copper foil sandwiched between layers of silver brazing material. The strips 34 are very slightly narrower than the thickness of the wafers and are placed edgewise in the spaces between the wafers 32 so that they will lie parallel to the edge faces thereof and entirely fill the spaces between the wafers 32. In effect, each wafer 32 is surrounded on all four edges with strips 34 and this is done manually with care and precision. It should be noted that the strips 34 are cut and fitted so that their upper edges do not extend above the surface of the wafers 32.

Once the wafers 32 are in place and are surrounded by the strips 34, a heavy ceramic weight (not shown) is placed over the wafers 32 to prevent them from shifting out of place and also to apply uniform brazing pressure to the assembly, forcing the brazing material 29, 31, and copper foil 30 into intimate contact with each other and the bottom face 28 of the depression 27. This ceramic weight also serves to maintain the upper surfaces of the wafers 32 precisely coplanar. Thereupon, the entire assembly is placed into a hydrogen oven and allowed to remain there until a sufficient interval has elapsed so as to allow the various sheets and strips of silver brazing material to liquify and braze the wafers 32 tightly and precisely in place.

After brazing, the die-body 1 is removed from the oven and allowed to cool slowly. Then, the ceramic weight is lifted off and, employing the pre-formed apertures 33 in the wafers 32 as guides, a plurality of axial extrusion ports or ducts 35 are drilled through the die-body 1, extending from the inner face of the wafers 32 to a shallow annular rearwardly opening recess 36 formed on the rear face 14 between the annular boss 25 and the outer peripheral margin of the steam dome 13. It will, of course, be understood that there will be one such extrusion port 35 for each aperture 33 and such port 35 will be coaxial with the aperture 33 from which it is bored. The extrusion ports 35 are then counterbored beginning from the recess 36 and extending forwardly into the die-body 1, but not extending to the wafers 32. Thus, each extrusion port or duct 35 opens at its forward end to one aperture 33 and is enlarged at its rearward end to provide a supply passage 37 which, in turn, opens into the recess 36 for communication with the main supply of molten material being extruded.

In connection with the present invention, it has been found, as a matter of extensive testing, that the tungsten carbide wafers 32 will remain firmly and securely attached to the die-body 1, notwithstanding repeated cycles of temperature change and this is true regardless of whether the temperature change is a small fluctuation of the type encountered routinely during the course of extrusion operations or a great temperature change of the kind which would be encountered in going from room temperature to operating temperature in starting up an extrusion machine or, conversely, in going from operating temperature to room temperature in shutting down such a machine. Apparently the thin layers of metallic copper serve as a cushioning film and absorb the dimensional devices resulting from differential expansion and contraction between the tungsten carbide wafers 32 relative to each other and also between the tungsten carbide wafers 32 and the die-body 1. In any case, whatever may be the proper theoretical explanation, it has been found, as a matter of actual experience, that the tungsten carbide wafers 32 remain firmly and precisely attached to the die-body 1 even after having been subjected to repeated temperature cycles of varying degree and duration. Furthermore, the outwardly presented faces of the tungsten carbide wafers 32, being precisely coplanar, afford a long-wearing accurate cutting surface across which a conventional pelleting knife or doctor-blade can operate to sever the extruded material into pellets or rods of any desired length.

It should be understood that changes and modifications in the form, construction, arrangement, and combination of the several parts of the carbide facing for extrusion dies may be made and substituted for those herein shown and described without departing from the nature and principle of my invention.

Having thus described my invention, what I claim and desire to secure by Letters Patent is:

1. The method of making a die-body which comprises forming a plurality of apertured wafers of tungsten carbide, covering a surface of the die-body with a thin layer of brazing material, a thin layer of copper, and another thin layer of brazing material so that the thin layer of copper is interposed between the layers of brazing material, laying said wafers in closely spaced side-by-side arrangement upon the layers of brazing material and copper located on the surface of the die-body interposing strips of laminate comprising a layer of copper interposed between layers of brazing material between adjacent edges of the wafers, placing a weight having a planar bottom surface on the wafers so as to maintain the outwardly facing surfaces of the wafers in coplanar relation to one another, heating the die-body and wafers with weight applied thereto in a furnace until the brazing material melts whereby to braze the wafers to the die-body with a layer of copper interposed therebetween and to braze the wafers to one another with strips of copper interposed therebetween.

2. An extrusion die comprising a die-body having a forwardly presented face and provided with a plurality of extrusion ports which terminate at the forwardly presented face, and a plurality of discrete wafers formed from a different and substantially harder material than the die-body, the wafers being brazed to the forward face and having extrusion apertures which register with the terminal portions of the extrusion ports, whereby extrusion material in a plastic state will pass in order through the extrusion ports, through the extrusion apertures, and out of the die in an extruded configuration.

3. An extrusion die comprising a die-body having a forwardly presented face and provided with a plurality of extrusion ports which terminate at the forwardly presented face, and a plurality of discrete wafers formed from a different and substantially harder material than the die-body, the wafers being brazed to the die-body in closely spaced side-by-side relation so that the forwardly exposed faces of the wafers form a substantially continuous surface, the opposed side faces of adjacent wafers being brazed to one another whereby the wafers are held securely to one another, each wafer having an extrusion aperture which registers with one of the extrusion ports in the die-body, whereby extrusion material in a plastic state will pass in order through the extrusion ports, through the extrusion apertures, and out of the die in an extruded configuration.

4. An extrusion die comprising a die-body having a forwardly presented face and provided with a plurality of extrusion ports which terminate at the forwardly presented face, a plurality of discrete wafers formed from a different and substantially harder material than the die-body, the wafers being mounted upon the die-body in slightly outwardly spaced relation to the forwardly presented face and in closely spaced side-by-side relation to one another so that the forwardly exposed faces of the wafers form a substantially continuous surface, each wafer having an extrusion aperture which registers with the terminal portion of one of the extrusion ports, and a thin cushioning layer interposed between and brazed to the wafers and the forwardly presented face of the die-body, the cushioning layer having a plurality of apertures which register with the extrusion apertures and extrusion ports so as to provide communication therebetween, whereby extrusion material in a plastic state will pass in order through the extrusion ports, through the extrusion apertures, and out of the die in an extruded configuration.

5. An extrusion die according to claim 4 and further characterized by cushioning strips interposed between the opposed side faces of adjacent wafers, the cushioning strips being brazed to the wafers whereby the wafers are joined to one another.

6. An extrusion die comprising a die-body having a forward face and provided with a flat bottomed recess extending inwardly from the forward face, the die-body further having a plurality of extrusion ports which terminate at the bottom of the recess, a plurality of discrete tungsten carbide wafers mounted in the recess in closely spaced side-by-side relation to one another and having their forwardly exposed faces substantially flush with the forward face of the die-body so as to form a substantially continuous surface therewith, each wafer having an extrusion aperture which registers with one of the extrusion ports in the die-body, a thin cushioning layer interposed between and brazed to the wafers and the bottom of the recess, the cushioning layer having apertures which register with the extrusion apertures and extrusion ports so as to provide communication therebetween, and cushioning strips interposed between and brazed to the opposed side faces of adjacent wafers, whereby the wafers are held securely to each other and to the die-body.

References Cited by the Examiner

UNITED STATES PATENTS 2,401,236    5/1946    Fielitz _____ 18—12
3,114,169    12/1963   Palmer et al. _____ 18—12

FOREIGN PATENTS 1,359,956    3/1964    France.

WILLIAM J. STEPHENSON, *Primary Examiner.*